United States Patent [19]
Bergmann

[11] Patent Number: 5,930,028
[45] Date of Patent: Jul. 27, 1999

[54] SPLIT RECIPROCAL POLARIZATION SWITCH

[75] Inventor: Ernest Eisenhardt Bergmann, Borough of Fountain Hill, Pa.

[73] Assignee: Lucent Technologies Inc., Murray Hill, N.J.

[21] Appl. No.: 09/082,828

[22] Filed: May 21, 1998

[51] Int. Cl.[6] .................................................. G02B 26/08
[52] U.S. Cl. ..................... 359/303; 359/320; 359/246; 359/251; 359/257; 359/484; 372/27; 372/37; 372/703
[58] Field of Search ..................... 359/320, 303, 359/301, 246, 256, 257, 251, 281, 282, 283, 324, 322, 484, 495; 372/37, 27, 703

[56] References Cited

U.S. PATENT DOCUMENTS

| | | | |
|---|---|---|---|
| 3,658,409 | 4/1972 | Shimbo et al. | 359/303 |
| 3,667,828 | 6/1972 | Kohima et al. | 359/303 |
| 4,461,543 | 7/1984 | McMahon | 359/320 |
| 4,464,022 | 8/1984 | Emkey | 359/324 |
| 4,969,717 | 11/1990 | Mallinson | 359/301 |
| 5,128,797 | 7/1992 | Sachse et al. | 359/246 |
| 5,251,057 | 10/1993 | Guerin et al. | 359/256 |
| 5,867,300 | 2/1999 | Onaka et al. | 359/283 |

*Primary Examiner*—Loha Ben

[57] ABSTRACT

A split reciprocal polarization switch (SRPS) for use in constructing high performance switching devices used in fiber optics. The SRPS allows selective changes in the polarization of one or the other of two optical rays passing therethrough along first and second bi-directional ray paths of the SRPS so that they emerge therefrom with the same polarizations. The SRPS includes a switching section for selectively changing the optical polarization of optical rays according to a selected state of the switching section, and a split section including a first and second sections having different polarization changing characteristics.

20 Claims, 5 Drawing Sheets

5,930,028

SPLIT RECIPROCAL POLARIZATION SWITCH

FIELD OF INVENTION

The present invention relates to optical switching devices, and more particularly to a split reciprocal polarization switch for routing and redirecting fiber-optic signals.

BACKGROUND OF THE INVENTION

Optical polarization switches are commonly employed in optical communication networks for routing and redirecting fiber-optic signals. Such switches, in combination with a polarization splitter/combiner, can switch the optical path along which a signal travels.

Conventional optical switches suffer from a major drawback. Specifically, they typically include moving parts which are susceptible to mechanical failure, thereby limiting the reliability of such switches. Accordingly, there exists a need for a reliable, optical polarization switch which has no moving parts and which can be used for routing and redirecting fiber-optic signals.

SUMMARY

A split polarization switch comprising a switching section for selectively changing the optical polarization of optical rays according to a selected state of the switching section, and a split section including a first and second sections having different polarization changing characteristics. The switch changes the polarization of one of two received orthogonally polarized optical rays so that the rays emerge therefrom with polarizations that are the same.

BRIEF DESCRIPTION OF THE DRAWINGS

A more complete understanding of the present invention may be obtained from consideration of the following detailed description in conjunction with the accompanying drawings in which.

DETAILED DESCRIPTION OF THE INVENTION

Figure 1A:
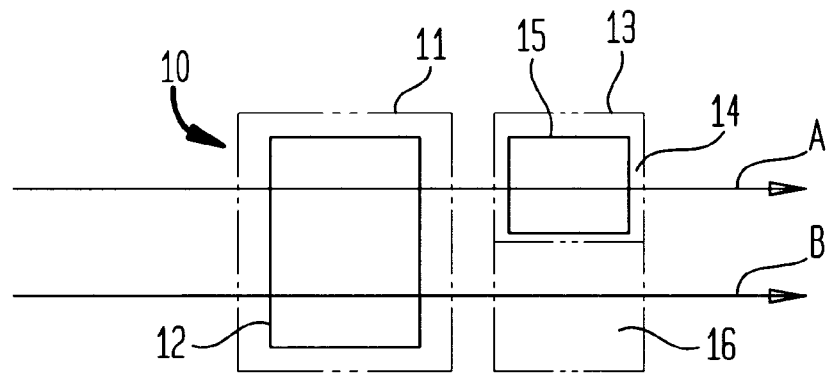
FIG. 1A shows an SRPS according to a first embodiment of the present invention.

FIG. 1A shows a split reciprocal polarization switch (SRPS) 10 according to a first embodiment of the present invention. It will be understood that the embodiments of the SRPS described herein act upon linearly polarized light which is initially either horizontally polarized or vertically polarized. The SRPS 10 comprises a switching section 11 and a split section 13. The switching section 11 includes a reciprocal polarization switch (RPS) 12. The split section 13 includes a first section 14 that contains a reciprocal polarization interchanger (RPI) 15 and a second section 16 which is unoccupied. The switching section 11 and the split section 13 are disposed relative to each other such that a first ray path A passes through both the RPS 12 and the RPI 15 and a second ray path B passes through just the RPS 12.

The RPS 12 of the switching section 11 operates in one of two states. In the first state, optical rays passing through the RPS 12 experience no change in polarization. In the second state or "interchange" state, optical rays passing through the RPS 12 experience a 90° change in polarization. Since the RPS 12 is a reciprocal device, changes in polarization do not depend on the direction in which the optical rays travel through the RPS 12.

The first and second sections 14 and 16 of the split section 13 have different polarization changing characteristics. Optical rays passing bi-directionally through the RPI 15 of the first section 14 experience a 90° change in polarization while optical rays passing bi-directionally through the unoccupied second section 16 experience no change in polarization.

Figure 1B:
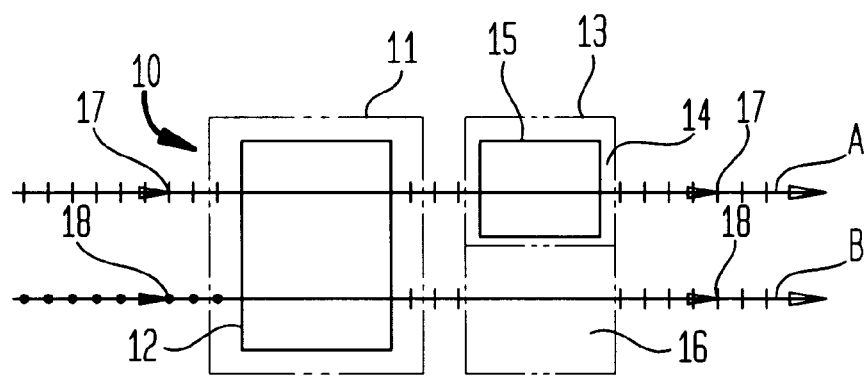
FIG. 1B shows the SRPS of FIG. 1A set to a first switch state.
Figure 1C:
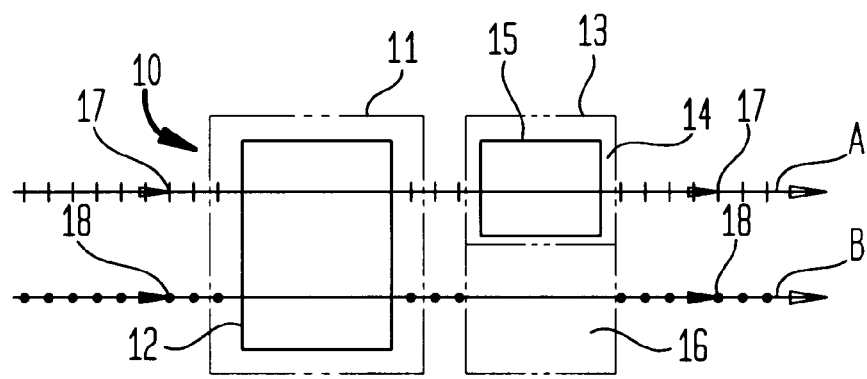
FIG. 1C shows the SRPS of FIG. 1A set to a second switch state.

The SRPS 10 selectively changes the polarization of optical rays traveling along one or the other of the optical ray paths A and B. Accordingly, two optical rays entering the SRPS 10 along respective ray paths A and B with polarizations which are orthogonal to each other emerge from the SRPS 10 with polarizations that are the same as illustrated in FIGS. 1B and 1C. Since SRPS 10 is a reciprocal device, rays can travel along ray paths A and B from left to right or from right to left. Unless otherwise indicated, it will be understood that all figures described herein show rays traveling from left to right.

In FIG. 1B, the polarization of an optical ray 17 (polarized "vertically") traveling along ray path A remains unchanged while the polarization of an optical ray 18 (polarized "out of the plane" of the figure) traveling along ray path B is changed when the RPS 12 is set to the interchange state. The optical ray 17 traveling along ray path A does not experience a net change of polarization because the effects of the RPS 12 and the RPI 14 cancel each other out. The optical ray 18 traveling along ray path B, however, experiences a change in polarization because of the effects of the RPS 12.

In FIG. 1C, the polarization of the optical ray 17 traveling along ray path A is changed while the polarization of the optical ray 18 traveling along ray path B remains unchanged when the RPS 12 is set to the non-interchange state. The optical ray 17 traveling along ray path A experiences a change of polarization because of the effects of the RPI 14. The optical ray 18 traveling along ray path B, however, experiences no change in polarization because the RPS 12 has no effect on it.

Figure 2A:
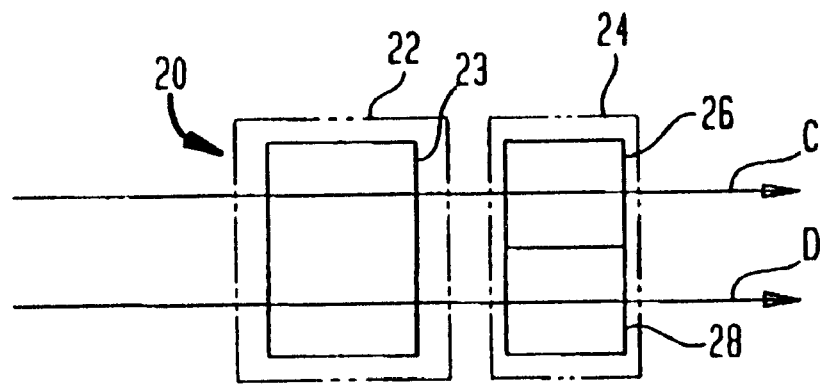
FIG. 2A shows an SRPS according to a second embodiment of the present invention.

FIG. 2A shows an SRPS 20 according to a second embodiment of the present invention. The SRPS 20 comprises a switching section 22 which includes a piece of magnetically affected garnet 23 and a split section 24 whose first and second sections are defined by a mosaic of latched first and second garnet pieces 26, 28. The switchable garnet piece 23 and the latched garnet pieces 26, 28 are disposed relative to each other such that a first ray path C passes through the switchable garnet piece 23 and the first garnet piece 26 and a second ray path D passes through the switchable garnet piece 23 and the second garnet piece 28.

The switching section 22 rotates the polarization of light either +45° or −45° depending upon the direction at which a magnetic field is applied through the magnetically affected garnet 23. The first garnet piece 26 can be adapted to rotate the polarization of light +45°, and the second garnet piece 28 can be adapted to rotate the polarization of light −45°. The magnetically affected garnet 23 and the first and second garnet pieces 26, 28 are each non-reciprocal. Accordingly, individual changes in polarization depend on the direction in which the optical rays travel through the SRPS 20.

The SRPS 20 of the second embodiment also selectively changes the polarization of optical rays traveling along one or the other of the optical ray paths C, D. Thus, two optical rays entering the SRPS 20 along respective ray paths C and D with linear polarizations which are orthogonal to each other emerge from the SRPS 20 with polarizations that are the same as illustrated in FIGS. 2B and 2C.

Figure 2B:
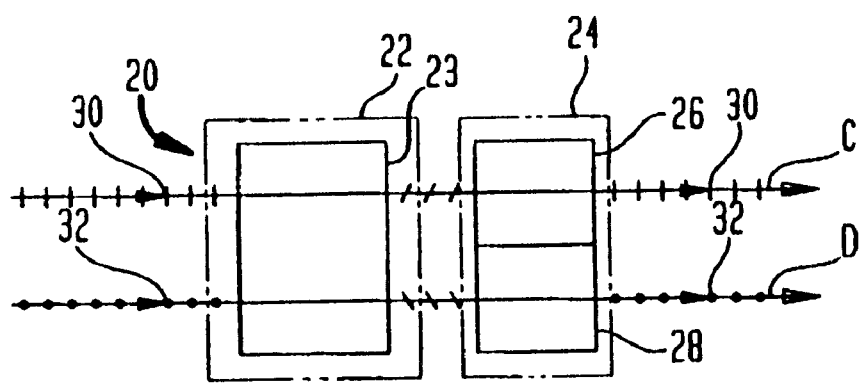
FIG. 2B shows the SRPS of FIG. 2A set to a first switch state.

In FIG. 2B a magnetic field is applied to the magnetically affected garnet 23 in a direction which causes a +45° rotation in the polarization of light. An optical ray 30 (polarized in the plane of the figure, i.e., "vertically") traveling through the SRPS 20 along ray path C experiences a polarization interchange because it has a net rotation of polarization of 90° (+45°+(+45°)) due to the effects of the switching section 22 and the first garnet piece 26. Due to the generally non-reciprocal nature of Faraday rotators as occurs in magnetized garnet, the net rotation of polarization of an optical ray traveling from right to left would appear to be (−45°+(−45°))=−90°, which, however, is indistinguishable from a net rotation of polarization of +90°.

By contrast, an optical ray 32 (polarized out of the plane of the figure, i.e., "horizontally") traveling through the SRPS 20 along ray path D under these conditions will not experience polarization interchange because the effects of the switching section 22 and the second garnet piece 28 cancel each other out (+45°+(−45°)). This behavior is indistinguishable from that for an optical ray traveling from right to left since the net rotation of polarization for such a ray would still be 0° (−45°+(+45°)).

Figure 2C:
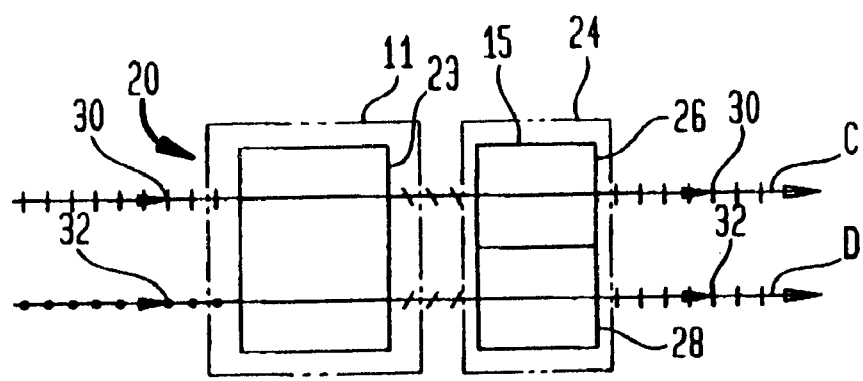
FIG. 2C shows the SRPS of FIG. 2A set to a second switch state.

In FIG. 2C, the direction of the applied magnetic field is reversed through the magnetically affected garnet 23 thereby causing the switching section 22 to rotate the polarization of light −45°. Thus, the optical ray 30 traveling through the SRPS 20 along ray path C experiences no polarization interchange because the effects of the switching section 22 and the first garnet piece 26 cancel each other out (−45°+(+45°)). However, the optical ray 32 traveling through the SRPS 20 along ray path D experiences a polarization interchange of −90° (−45°+(−45°)) because of the additive effects of the switching section 22 and the second garnet piece 28.

Figure 3A:
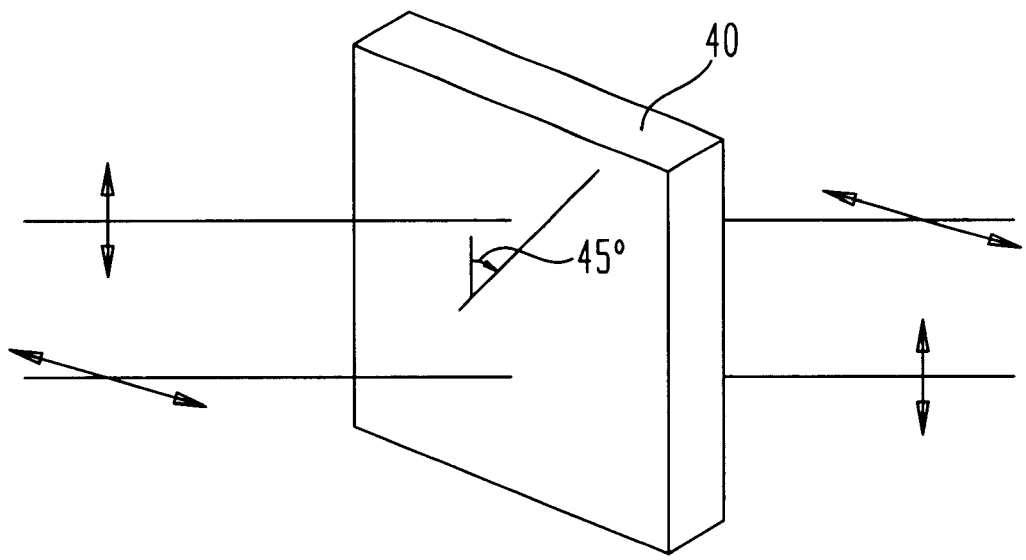
FIG. 3A shows a half-wave-plate.

The components of the switching section and the split section may be implemented with various types of well known optical devices such as mechanically moveable half-wave plates, 90° Faraday rotators, 45° Faraday rotators, and/or Pockels cells. FIG. 3A shows a half-wave plate 40. The half-wave-plate flips the if vertical/horizontal polarizations of a light beam about the beam's fast axis which is 45° to the principal polarization direction. Other polarizations are not necessarily converted. For example, light polarized at 45° to the vertical will pass through a half-wave plate without experiencing a change in polarization.

Figure 3B:
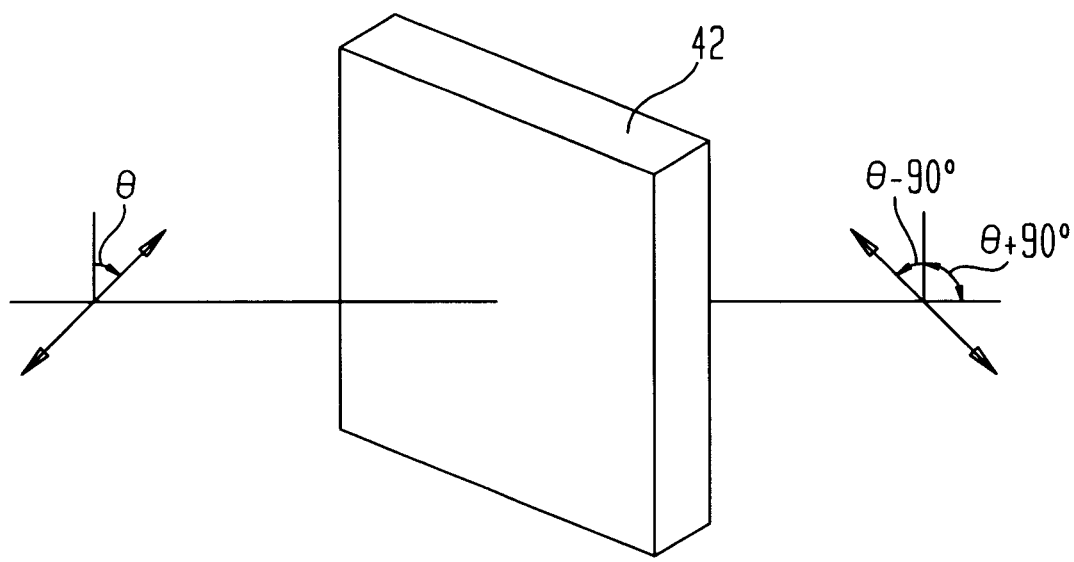
FIG. 3B shows an optically active rotator.

FIG. 3B shows a +90° Faraday or optically active rotator 42. The rotator 42 rotates the polarization of light propagating therethrough when an external magnetic field is applied in the direction of propagation. Since a +90° rotation of polarization can not be distinguished from a −90° rotation of polarization, the rotator is always effectively reciprocal.

Figure 3C:
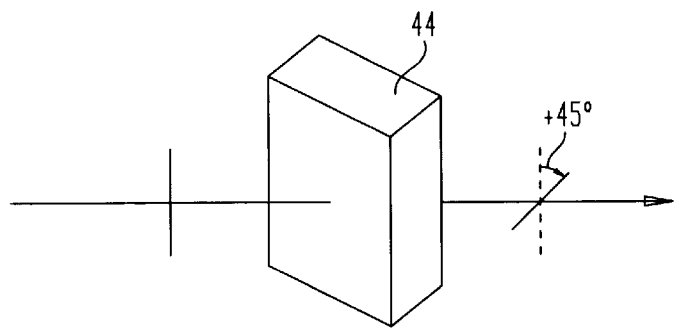
FIGS. 3C and 3D show a +45° Faraday rotator.
Figure 3D:
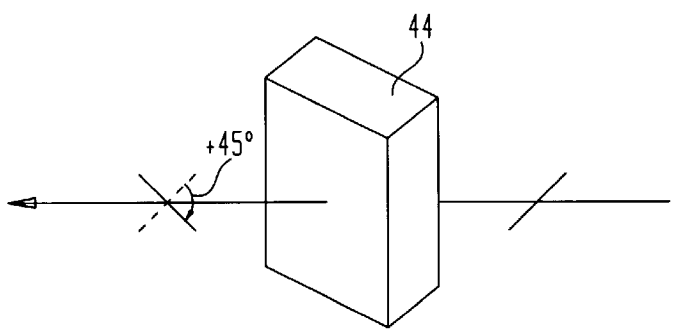

FIGS. 3C and 3D show a +45° Faraday rotator 44 which twists the direction of polarization of light by +45° in the clockwise direction as viewed from left to right. Since rotator 44 is a non-reciprocal device, the polarization of an optical ray passing through the device from left to right is different than that of a ray passing through the device from right to left. In particular, FIG. 3C shows that for an optical ray passing from left to right, the polarization is vertical, whereas for a ray passing from right to left as shown in FIG. 3D the polarization is horizontal.

Figure 3E:
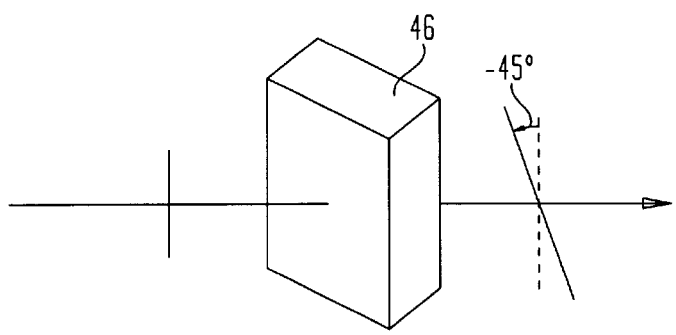
FIGS. 3E AND 3F show a −45° Faraday rotator.
Figure 3F:
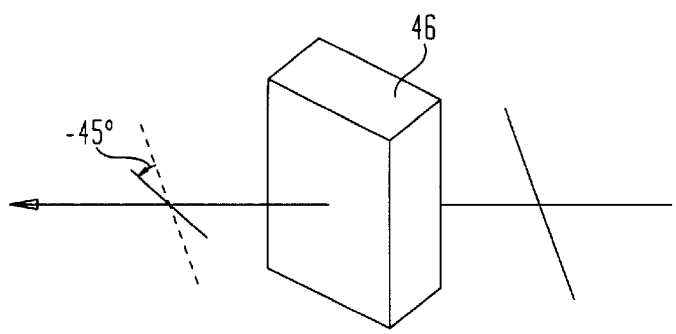

FIGS. 3E and 3F show a −45° Faraday rotator 46 which twists the direction of polarization of light by −45° in the clockwise direction as viewed from left to right. Since rotator 46 is a non-reciprocal device, the polarization of an optical ray passing through the device from left to right is different than that of a ray passing through the device from right to left. In particular, FIG. 3E shows that for an optical ray passing from left to right, the polarization is vertical, whereas for a ray passing from right to left as shown in FIG. 3F the polarization is horizontal.

Figure 4:
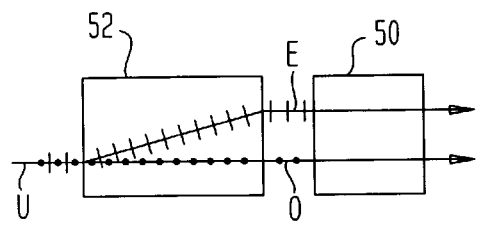
FIG. 4 shows the combination of an SRPS with a walk-off device.

FIG. 4 shows the use of the SRPS of the present invention denoted by the numeral 50 with a walk-off device 52. The walk-off device 52 splits an unpolarized optical ray U into two parallel optical rays E and O which have polarizations which are orthogonal to each other. The optical rays E and O pass through the SRPS 50 so that one of the optical rays E and O will have its polarization interchanged such that both optical rays E and O emerge from the SRPS 50 with identical polarizations. Conversely, two parallel rays which are either vertically or both horizontally polarized and traveling from right to left and converted by a suitably configured SRPS 50 will be walked off together by device 52 to become optical ray U.

Figure 5:
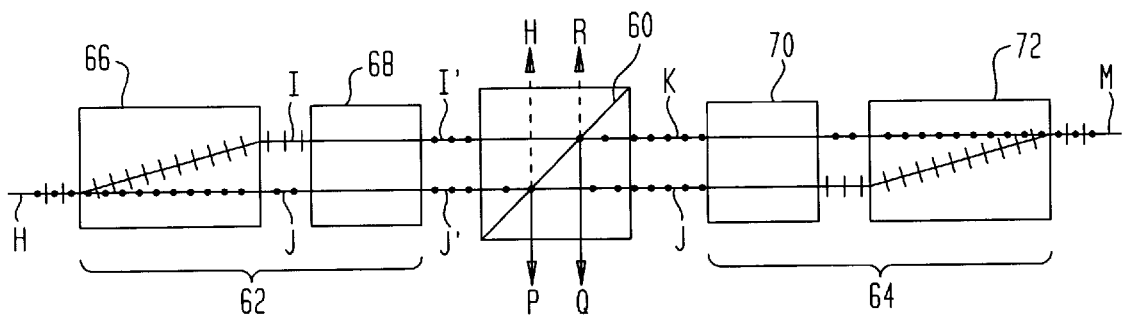
FIG. 5 shows two SRPS/walk-off device combinations used with a polarization beam splitting cube.

The SRPS/walk-off device combination described above can be advantageously used with polarization dependent devices such as polarization beam splitters. FIG. 5 shows a polarization beam splitting cube 60 combined with two SRPS/walk-off device combinations 62, 64. The first walk-off device 66 splits an optical ray H into two parallel optical rays I, J that have polarizations that are orthogonal to each other such that one of these polarizations would be reflected by the beam splitting cube 60 and the other will be transmitted through the cube 60. The optical rays I, J pass through the first SRPS 68 and emerge as rays I', J' with identical polarizations. If the optical rays I', J' have polarizations which are reflected by the beam splitting cube 60, optical rays I', J' will couple with polarized rays N and R. If the optical rays I', J' have polarizations which are transmitted through the polarizing beam splitting cube 60, optical rays I', J' will emerge from the cube 60 as optical rays K and L. The selected state of the SRPS 68 determines whether the optical rays I' and J' have polarizations which are both reflective or both transmissive.

Optical rays K and L pass through the second SRPS 70 which alters their polarizations so that they can be combined in the second walk-off device 72 and emerge therefrom as optical ray M. With suitably chosen states for the first and second SRPSs 68, 70, optical rays H and M can be coupled for all polarizations. Moreover, optical ray M can be coupled instead with polarized rays P and Q by changing the state of the second SRPS 70.

It should be understood that the embodiments described herein are merely exemplary and that a person skilled in the art may make many variations and modifications to the embodiments utilizing functionally equivalent elements to those described herein. Any and all such variations or modifications as well as others which may become apparent to those skilled in the art are intended to be included within the scope of the invention as defined by the appended claims.

What is claimed is:

1. A split reciprocal polarization switch comprising:

a switching section for selectively changing the optical polarization of optical rays according to a selected state of the switching section, and a split section including a first section and a second section each having different polarization changing characteristics, wherein the switch changes the polarization of one of two received orthogonally polarized optical rays so that the rays emerge from the switch with polarizations that are the same.

2. The switch according to claim 1, wherein the switching section produces one of two polarization outputs in response to an optical ray of a given input polarization, the two polarization outputs being orthogonal to each other.

3. The switch according to claim 1, wherein only one of the first and second sections of the split section changes the polarization of an optical ray.

4. The switch according to claim 1, wherein the switching section includes a switched Faraday rotator to effect changes in the optical polarization of the optical rays.

5. The switch according to claim 4, wherein the switched Faraday rotator is made from garnet.

6. The switch according to claim 1, wherein the switching section includes a Pockels cell.

7. The switch according to claim 1, wherein the switching section includes mechanically moveable half-wave plates.

8. The switch according to claim 1, wherein the switching section includes a piece of magnetically affected garnet.

9. The switch according to claim 8, wherein the split section includes two latched pieces of garnet.

10. The switch according to claim 9, wherein the piece of magnetically affected garnet rotates the polarization of an optical ray either +45° or −45° depending upon the direction of an applied magnetic field and wherein one of the two latched pieces of garnet rotates the polarization of an optical ray +45° and the other one of the two latched pieces of garnet rotates the polarization of an optical ray −45°.

11. A split reciprocal polarization switch comprising:

a switching section for selectively changing the optical polarization of optical rays according to a selected state of the switching section, and a split section including a first section and a second section each having different polarization changing characteristics, wherein the switch changes the polarization of two received optical rays having the same polarization so that the rays emerge from the switch orthogonally polarized to one another.

12. The switch according to claim 11, wherein the switching section produces one of two polarization outputs in response to an optical ray of a given input polarization, the two polarization outputs being orthogonal to each other.

13. The switch according to claim 11, wherein only one of the first and second sections of the split section changes the polarization of an optical ray.

14. The switch according to claim 11, wherein the switching section includes a switched Faraday rotator to effect changes in the optical polarization of the optical rays.

15. The switch according to claim 14, wherein the switched Faraday rotator is made from garnet.

16. The switch according to claim 11, wherein the switching section includes a Pockels cell.

17. The switch according to claim 11, wherein the switching section includes mechanically moveable half-wave plates.

18. The switch according to claim 11, wherein the switching section includes a piece of magnetically affected garnet.

19. The switch according to claim 18, wherein the split section includes two latched pieces of garnet.

20. The switch according to claim 19, wherein the piece of magnetically affected garnet rotates the polarization of an optical ray either +45° or −45° depending upon the direction of an applied magnetic field and wherein one of the two latched pieces of garnet rotates the polarization of an optical ray +45° and the other one of the two latched pieces of garnet rotates the polarization of an optical ray −45°.

* * * * *